United States Patent [19]

Kröning et al.

[11] Patent Number: 4,481,460
[45] Date of Patent: Nov. 6, 1984

[54] INVERTER WITH CHARGING REGULATOR HAVING A VARIABLE KEYING RATIO

[75] Inventors: Armin Kröning, Seebruck; Max Kerscher, Chieming; Peter Krummel, St. Georgen, all of Fed. Rep. of Germany

[73] Assignee: Siemens Aktiengesellschaft, Berlin & MUnich, Fed. Rep. of Germany

[21] Appl. No.: 464,585

[22] Filed: Feb. 7, 1983

[30] Foreign Application Priority Data

Feb. 8, 1982 [DE] Fed. Rep. of Germany ....... 3204225
May 28, 1982 [DE] Fed. Rep. of Germany ....... 3220301

[51] Int. Cl.$^3$ .................... H02P 13/16; H05B 41/29
[52] U.S. Cl. .................... 323/266; 323/222; 363/89; 363/37; 315/208; 315/DIG. 7
[58] Field of Search .................... 363/21-26, 363/37, 86, 89, 124; 323/222, 224, 266; 315/206, 208, 219, DIG. 7

[56] References Cited

U.S. PATENT DOCUMENTS

| | | | |
|---|---|---|---|
| 4,188,661 | 2/1980 | Bower et al. | 315/DIG. 7 |
| 4,251,752 | 2/1981 | Stolz | 315/208 X |
| 4,392,085 | 7/1983 | Knoll et al. | 315/DIG. 7 |

FOREIGN PATENT DOCUMENTS

| | | | |
|---|---|---|---|
| 1803486 | 5/1970 | Fed. Rep. of Germany. | |
| 1947901 | 4/1971 | Fed. Rep. of Germany | 323/222 |
| 2804694 | 8/1979 | Fed. Rep. of Germany. | |
| 0444172 | 4/1975 | U.S.S.R. | 323/222 |
| 0691819 | 10/1979 | U.S.S.R. | 323/266 |

Primary Examiner—Peter S. Wong
Attorney, Agent, or Firm—Hill, Van Santen, Steadman & Simpson

[57] ABSTRACT

An inverter with a dc-source has a charging condenser connected through a charging diode and a charging inductor to the dc-supply. A charging switch is periodically closed by a control component with a variable keying ratio to connect the charging inductor to the dc-supply. The inverter includes an AC voltage converter with two alternatingly controlled switches supplied with power by the charging condenser, hereinbelow identified as the primary switch and the secondary switch, which are in a series circuit in parallel with the charging condenser. In this arrangement, the control component for the charging switch of the charging regulator is synchronized with a square wave voltage at one of the switches of the alternating voltage converter. The charging switch operates at the same switching frequency as the alternating voltage converter. When the square-wave voltage at a switch of the alternating voltage converter terminates during a non-oscillating condition of the alternating voltage converter, then the charging switch of the charging regulator also remains open. At a disruption, there need, accordingly, only be deactivated the inverter.

7 Claims, 6 Drawing Figures

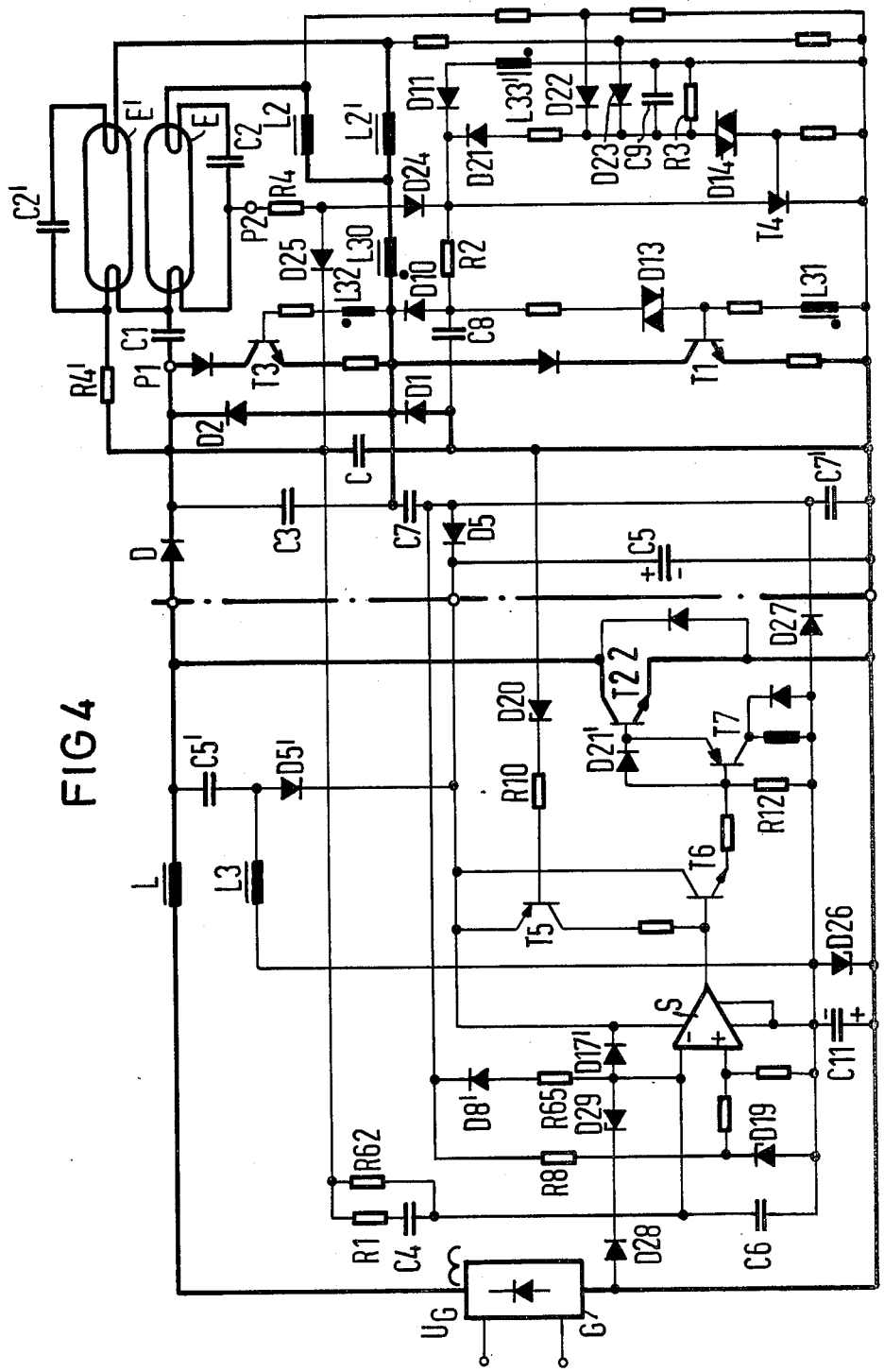

INVERTER WITH CHARGING REGULATOR HAVING A VARIABLE KEYING RATIO

RELATED APPLICATION

This application is related to pending national filing of PCT application, PCT/DE82/00155.

BACKGROUND OF THE INVENTION

1. Field of the Invention

The present invention relates to an inverter with a dc-voltage supply, including a charging regulator incorporating a charging condenser connected through a charging diode and a charging inductor to the dc-supply, as well as a charging switch which is periodically closed by a control component with a variable keying ratio to connect the charging inductor to the dc-supply. The inverter includes an AC voltage converter with two alternatingly controlled switches supplied with power by the charging condenser, hereafter identified as the primary switch and the secondary switch, which are in a series circuit in parallel with the charging condenser.

2. Discussion of the Prior Art

An inverter of this type is described in U.S. Pat. No. 4,251,752, incorporated herein by reference, in which the control of the charging switch is a relatively complicated circuit.

In such a circuit the charging regulator should be deactivated when no energy is withdrawn from the charging condenser, for example, during non-oscillating periods of the alternating voltage converter.

SUMMARY OF THE INVENTION

Accordingly, it is an object of the present invention to simplify the control of the charging switch in an inverter of the above-mentioned type. In particular, a design is provided such that the charging regulator will automatically switch off at a non-oscillating condition of the alternating voltage converter and operate with as low a loss as possible.

The foregoing object is achieved by the invention as described herein for an inverter of this type in that the control component for the charging switch of the charging regulator is synchronized with a square wave voltage at one of the switches of the alternating voltage converter.

In an inverter according to the invention for use with a dc voltage source and including a charging regulator having a charging capacitor connected through a charging diode and a charging inductor to a rectifier for supplying said dc voltage source, a charging switch is provided. Means for periodically closing the charging switch with a variable keying ratio V dependent upon a control magnitude of the control component to switch the charging inductor to the rectifier is provided. A converter having two alternatingly controlled switches supplied by the charging capacitor is provided, the two switches being a primary switch and a secondary switch connected in a series circuit parallel to the charging capacitor. Means for synchronizing the control component for the charging switch by a square wave voltage on one of the primary and secondary switches is provided such that the charging switch is closed upon blocking of one of the primary or secondary switches and, after a time period determined by a charge of a delay storage element to a certain operating value, the charging switch is blocked. A discharge circuit of the delay storage element is conducted via the one primary or secondary switch where blocking was initially sensed.

Thus, in accordance with the present invention, the charging switch operates at the same switching frequency as the alternating voltage converter, and the control voltage for the charging switch, for example, across a capacitative voltage divider, is taken from the square-wave voltage at a switch of the alternating voltage converter. When this voltage terminates during a non-oscillating condition of the alternating voltage converter, then the charging switch of the charging regulator also remains open. At a disruption, there need be deactivated only the inverter. Further the charging switch is only activated after the inverter begins functioning.

The keying ratio of the actuation switching period of the charging switch relative to the total period interval determines the voltage on the charging condenser. This keying ratio is preferably determined by the charging period of a delay storage element, in particular a delay condenser, the discharging circuit of which includes one of the switches of the alternating current voltage converter for synchronizing.

The actuation period of the charging switch is determined directly by the charging period of the delay storage element, and commences with the beginning or the end of the square-wave voltage of one of the switches of the alternating voltage converter.

With the prerequisite that the dc-supply is a rectifier which delivers a substantially half-wave rectified voltage and the average voltage on the charging condenser is only slightly larger than the peak value of the half-wave voltage of the rectifier, the discharge voltage (difference between the voltages on the charging condenser and on the rectifier) of the charge inductor varies within a half-wave of the supply alternating voltage, which at a constant keying ratio leads to deviations of the supply current from a sinusoidal form.

In order to avoid this, the keying ratio has, in a known manner as disclosed by German Laid-open Patent Application No. 26 52 275, incorporated herein by reference, in the middle region of each half-wave of the half-wave voltage of the rectifier a minimum value, and in the first and last third of the half-wave a maximum value, and varies therebetween in controlled dependency upon the instantaneous value of this half-wave voltage or the voltage on the charging condenser. The minimum value is preferably designed or chosen such that the charge inductor, at rated voltage on the charge condenser and charged at its rated load, can be fully discharged before each charge. Furthermore, it is advantageous that the keying ratio is also dependent upon the median value of voltage on the charging condenser in order to maintain this voltage as constant as possible.

The operation of the converter with semiconductor elements additionally provides voltages at a low level. In accordance with a further advantageous modification of the present invention, the circuit is extensively loss-free through the use of a voltage divider formed by two condensers, which are arranged in parallel with the charging switch and/or one of the switches of the alternating voltage converter and also limit the voltage rise upon opening of the switch. This aids in the utilization of transistors as switches by lowering the switching-off-losses.

The alternating voltage converter which is supplied by the charging regulator can be constructed as a bridge circuit with four switches or with two switches and two condensers. Preferably, however, this relates to a reversing alternating voltage converter with only two switches and one load branch, which is connected in parallel with the secondary switch, and has in series a reversing condenser, the load, a series resonant circuit, and the primary winding of a saturation transformer. The saturation transformer includes secondary windings for alternating control of the two switches of the alternating voltage converter, whereby the operating frequency of the alternating voltage converter, which is determined by the saturation transformer, is somewhat above the resonant frequency of the series resonant circuit. When utilizing transistors as the switches in connection with the known anti-parallel connected return flow diodes, this assures an avoidance of an overlapping of the switching periods of the transistors. The starting pulse is conducted from a trigger condenser through a trigger diode to the primary switch of the alternating voltage coverter.

The frequency of the converter could also be determined by an oscillator, delivering the control-voltages for the transistors of the converter. Then it is simply possible to alter the output voltage by varying the frequency of the oscillator.

The inverter is primarily designed for the operation of discharge lamps with preheatable electrodes, wherein the condenser of the series resonant circuit is placed always between the two electrodes of one discharge lamp. Accordingly, dimming of the lamps is achieved by varying the frequency of the converter.

BRIEF DESCRIPTION OF THE DRAWINGS

Reference may now be had to the following detailed description of three preferred embodiments of the invention, taken in conjunction with the accompanying drawings, in which:

FIG. 4 illustrates a second embodiment of the invention.

DETAILED DESCRIPTION OF THE PREFERRED EMBODIMENTS

Figure 1:
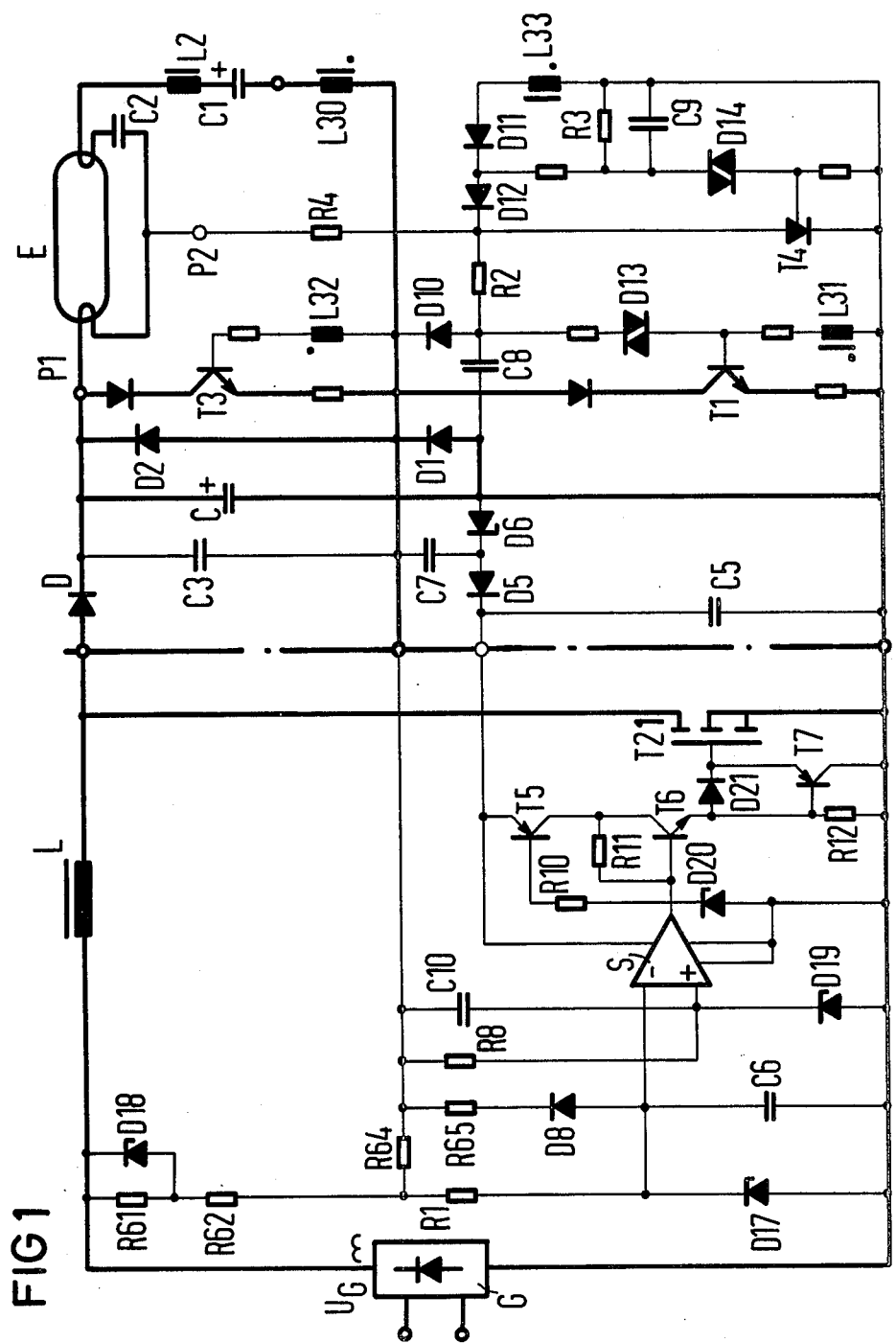
FIG. 1 illustrates a first embodiment of an inverter circuit pursuant to the present invention.
Figure 2:
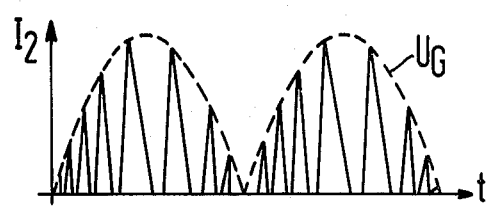
FIG. 2 illustrates a plot of the half-wave voltage of the rectifier G (in dashed lines) and the cycle of the current $I_1$ through a charge inductor.

Referring to FIG. 1, a rectifier G is coupled in a two way circuit at its input through a filter (not shown) to an alternating voltage supply (220 volts/50 cycles), and supplies power at its output at a charging condenser C through a charging inductor L and a charging diode D. An alternating voltage converter is coupled in parallel with capacitor C, and comprises two alternatingly connected transistors in a series circuit. The transistor T3 adjacent to a charging diode D3 is designated hereafter as the secondary transistor, and the other transistor T1 is designated as the primary transistor. Placed in parallel with the secondary transistor T3 is a load branch with a discharge lamp E, a series resonant circuit C2, L2, a reversing condenser C1, and the primary winding L30 of a saturation transformer, all in a series circuit. The condenser C2 of the series resonant circuit is located between the two preheatable electrodes of the discharge lamp E, which has one electrode connected directly to the charging condenser C.

The saturation transformer includes two secondary windings L31, L32, as well as a switch-off winding L33. The secondary windings L31, L32 are connected in the control circuits of the primary and secondary transistors T1, T3 such that they are alternatingly controlled during the remagnetization or resaturation period of the saturation transformer. The saturation transformer is selected such that the operating frequency of the alternating voltage converter, which is determined thereby, is somewhat above the resonant frequency of the series resonant circuit. This produces time gaps between sequential control pulses, such that a concurrent conductance of the primary and secondary transistors is precluded and thereby a short circuiting of the voltage on the charging condenser C. To allow current to flow during the time period of concurrent blocking of both transistors, current return diodes D1, D2 are provided in parallel with each of the transistors. During the conductive period of the primary transistor T1, the voltage on the condenser C is applied to the load branch and charges the reversing condenser C1 with the polarity indicated in FIG. 1.

After blocking of transistor T1, current flows through the load branch, driven by the inductor L2 of the series resonant circuit, and flows through the return current diode D2 until transistor T3 is actuated. Thereafter, the reversing condenser C1 discharges through transistor T3 and the load branch until T3 is again blocked. Thereafter, the load current flows in the same direction across the charge condenser C and the return current diode D1 pursuant to renewed actuation of transistor T1. The cycle of the square wave voltage $U_{T1}$ on the primary transistor is illustrated (in an idealistic case), in FIG. 3c.

The electrical energy which is discharged from the charging condenser C during operation of the converter is conducted thereto to recharge the capacitor C from the rectifier G through the charging inductor L and the charging diode D. In the embodiment of FIG. 1, for this purpose a MOS transistor T21 serves as a load charging switch which is coupled in parallel with the rectifier G through the charging inductor L. When T21 is conducting the charging inductor L is charged by the half-wave voltage of the rectifier G. After the blocking of T21, discharges through the charging diode D to the charging condenser C or respectively the converter connected thereto and its appliances. The charging and discharging of the charging inductor are synchronized with the switching sequences of the converter, which oscillates for example at 40 kHz. With the same frequency the charging inductor is charged and discharged during the half-waves of the half-wave voltage delivered by the rectifier G. The current pulses are integrated by the filter ahead of the rectifier to a generally sinusoidal supply current, such that the filter, because of the high switching frequency, can be relatively small.

Figure 3A:
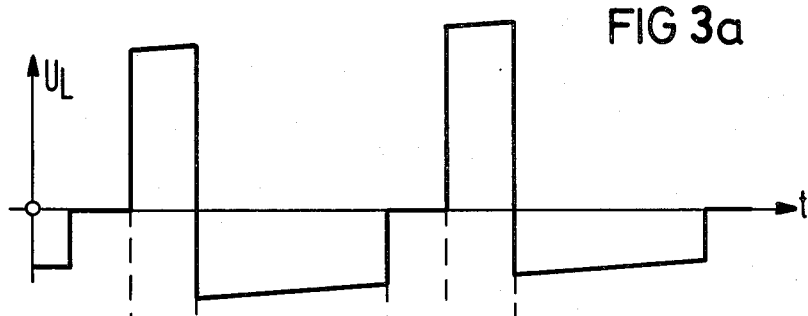
FIG. 3a illustrates the cycle of the voltage $U_1$ on the charge inductor.
Figure 3B:
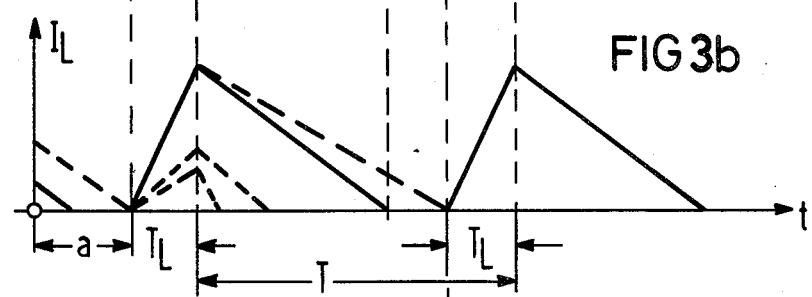
FIG. 3b shows the current $I_1$ through the charge inductor.

FIGS. 3a and 3b schematically illustrate on an enlarged scale a cycle of the voltage $U_L$ at the charging inductor L and its current $I_L$ during a charging and discharging cycle. The charging inductor L is always charged to the instantaneous value of the half-wave voltage, as a result of which the rise of the charging current correspondingly varies. In contrast therewith, for discharging of the inductor, the difference between the instantaneous value of the half-wave voltage and the practically constant voltage on the charging condenser C is significant, so that the longest possible discharging period at a maximum instantaneous value is obtained. The keying ratio V of the actuation period $T_L$ of the charging switch to the period interval T is selected such that the maximum energy stored by the charging inductor, in effect at the point in time of the maximum value of the half-wave voltage, discharges completely through the charging diode D prior to its subsequent charging. Only then, upon triggering of the charging switch T2 there will be no return current through the charging diode D and thereby a switching of the charging switch without any loss; furthermore it is possible only then to achieve the smallest possible dimension for the charging inductor.

In this embodiment a comparator S serves as the control for the charging switch, and its switching input (+) is connected to a Zener diode D19 which is connected in parallel with the primary transistor T1 through a resistor R8 and the parallel condenser C10. The blocking input (−) of the comparator is connected to a delay condenser C6 which is also connected in parallel through a discharge diode D8 and a resistor R65 to the primary transistor T1. For charging, the delay condenser C6 is connected through a charging resistor R1 on one side through a nonlinear resistance (R62, R61, Zener diode D18) to the rectifier G, and is connected on the other side through a resistor R64 to the charger condenser C when secondary transistor T3 is in an on-condition. The voltage on the delay condenser C6, limited by the Zener diode D17, is thus dependent upon the instantaneous value of the half-wave voltage of the rectifier and the voltage on the charging condenser C. The Zener diode D18 is non-conducting at lower values of the half-wave voltage such that charging up of the capacitor C6 dependent upon the half-wave voltage at lower momentary values is negligible in comparison to the charging by the voltage of the charging condenser C. At high instantaneous values of the half-wave voltage and conductive Zener diode D18 the influence of the half-wave voltage on the charge of C6 dominates, thereby shortening the activation period $T_2$.

The storage condenser C5, placed in parallel to the primary transistor T1, delivers an operating voltage for the comparator S and the control current for the charging switch T21, and is periodically discharged by T1. The control current for T21 thereby flows through transistors T5 and T6 and through a diode D21 so as to block a transistor T7. The voltage at C5 must equal at least the Zener voltage of diode D20, so that the transistor T5 is in an on-condition. Furthermore, the transistor T6 must be controlled by the comparator S with a positive potential, which is the case when the signal at the control input (+) is higher than that at the blocking input (−). When the transistor T6 is blocked by the comparator through a minus (−) signal, then the blocking voltage at R12 is eliminated for the transistor T7 through which then flows a blocking pulse for T21.

Figure 3C:
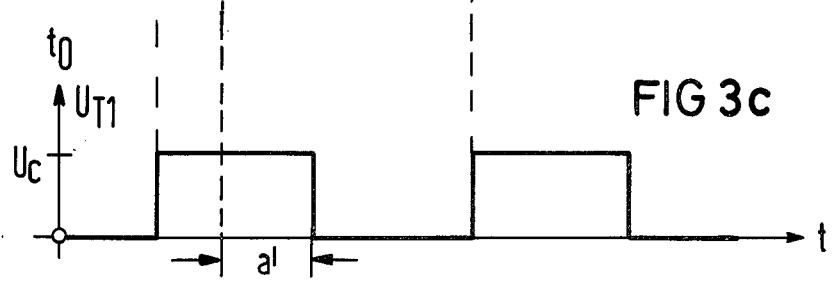
FIG. 3c illustrates the phase of the synchronized square-wave voltage $U_{T1}$ in the embodiment according to FIG. 1.

For an explanation of the synchronized control of the charging switch T21, reference is made to FIG. 3c. When blocking the primary transistor T1 at the timepoint t1, there is immediately present at the control input (+) of the comparator S a positive reference voltage defined by the Zener diode D19. The voltage at the blocking input (−), in contrast therewith, rises slowly only with the charging of the previously discharged delay condenser C6 against a value which is given by the half-wave voltage $U_G$ and the voltage on the charging condenser C. In this arrangement, the signal present at the control input (+) is greater than at the other input (−) so that the comparator S from timepoint t1 on, delivers a positive control signal to thereby close the charging switch T21. After a period of time $T_L$ depending upon the half-wave voltage $U_G$ and the voltage on the charging condenser, the signal at the blocking input (−) of the comparator S has increased to such an extent that the comparator switches and a negative blocking signal is delivered at its output to open the charging switch T21.

This switched condition is maintained up to the next blocking of T1. As long as T1 is still blocked, both of the inputs of the comparator V are coupled across R1, R64, or R8 respectively and further across D10, R2 and R4 to the voltage of the charging condenser C1. The Zener diodes D17 and D19 function such that the voltage at the blocking input (−) is larger than at the control input (+). This operation also results in switching off of T21 when a switching off of the converter is maintained.

During the subsequent control period of the primary transistor T1, the condenser C6 is discharged through D8 and resistor R65, the time constant being sufficiently large that the signal at C6 during the entire on-time of T1, does not drop below the voltage at the control input (+). The last mentioned voltage is initially determined by the discharge of C10 through D19 and R8 and is thereby negative. After discharging of C10, the potential at the control input (+) is below that at the blocking input (−) by the voltage drop from D8 and R65 so that the comparator S, until renewed blocking of T1, blocks the charging switch T21.

The converter, and thereby concurrently the charging regulator, only begin to operate when the voltage on a starting or triggering condenser C8 has achieved such a value that its energy is connected through trigger diode (DIAC) D13 to the control section of the primary transistor T1, whereby the latter is actuated. The starting condenser C8 is connected through resistors R2, R4 and one electrode of lamp E to the charging condenser C, and is further connected through a diode D10 in parallel to the switching section of the primary transistor T1. After the application of the supply voltage to the rectifier, which may also be a dc-voltage, the charging condenser C charges through the charging inductor L and the charging diode D, and thereby the starting condenser C8 will also be triggered up to the primary transistor T1. Concurrently therewith, the starting condenser is discharged through D10 so that this starting circuit is no longer engaged during periodic oscillations of the inverter.

During operation of the inverter with a discharge lamp E provision must be made for turning off of the converter when the discharge lamp is continually unable to start and provides for repeated, unsuccessful attempts at starting. For this purpose a stop thyristor T4 is provided which has connected parallel therewith a switch-off winding L33 of the saturation transfomer TR through diodes D11, D12, and is connected in parallel to the triggering condenser C8 through R2, and which obtains its holding current through the electrode of the discharge lamp adjacent to the charging condenser CM and a resistor R4.

An RC circuit R3, C9 is also connected to the switch-off winding L33 through diode D11, which is also coupled through a trigger diode D (DIAC) D14 in parallel with the control section of the stop thyristor T4. The function and design of this circuit is based on the fact that the amplitude of the current at an unignited lamp resonance flowing through the load branch with the discharge lamp, sensed by the switch-off winding L33, is substantially larger than that for an ignited lamp (attenuated resonant circuit) such that subsequent to a given number of unsuccessful starting attempts determined by the circuit parameters, C9 will have been charged to such an extent that the stop thyristor will trigger through the trigger diode 14 and short circuit the switch-off winding L33. This arrangement eliminates the control voltages for the transistors of the inverter, and the operation of the inverter is interrupted. Such a switching off will be caused neither by the normal ignition attempts nor by the normal lamp current since the voltage at C9 will not attain the required value required for the activation of the trigger diode D14.

Because of the synchronized control of the charging regulator in dependence upon the square-wave voltage at the switches of the converter, the charging regulator is again automatically switched off with the converter and again switched on after the start of the converter.

The converter remains switched off until the holding current of the stop thyristor T4 is interrupted, and can thereby again proceed into the blocked condition. For this purpose, the supply alternating current voltage can, for example, be switched off. However, quite frequently the switching off is the result of a defective lamp, which can be replaced without switching off of the supply voltage. Since also the current circuit of the starting condenser C8 is conducted across an electrode of the lamp, the converter will again automatically activate after the insertion of a new lamp.

The second embodiment according to FIG. 4 is discussed below only to the extent that it differs from the embodiment of FIG. 1 of the drawings.

The charging regulator, to the left of the phantom line, operates with a bipolar transistor T22, the control of which requires a negative operating voltage. This voltage, and the positive operating voltage on the storage condenser C5, are generated in the following, low-loss manner.

A capacitive voltage divider with condensers C7, C7' is arranged in parallel to the primary transistor T1 of the converter. The capacitors C7, C7' will positively charge when T1 is blocked, and the largest portion of the high blocking voltage on T1 is across C7 which has an essentially smaller capacitance. At the actuation of T1, C7 will then discharge in C7' and provided its voltage is sufficiently high, through D27 into the storage condenser C11, the voltage of which is limited by a Zener diode D26. After actuation of the converter, the storage condensers C5 and C11 will then charge with the indicated polarity, to the positive and respectively negative operating voltages. In contrast, a square wave voltage is produced at C7' which is limited in a positive sense by the voltage at C5 and is limited in a negative sense by that at C11, and which serves for control of the comparator S. The charging regulator only assumes operation when the positive operating voltage at C5 is sufficiently large, and accordingly T5 is controlled through the Zener diode D20 and R10.

The storage condenser C5 is in a series circuit with the diode D5' and the condenser C5', which is parallel to the charging switch T22, and reduces the switch-off losses. During a blocked state of T22 these two condensers will accordingly charge, and the major portion of the voltage will be across the smaller sized capacitor C5'. Following actuation of T22, C5' will then discharge through the reversing inductor L3 into the condenser C11 which delivers negative operating voltage.

The delay condenser C6 at the negative input of the comparator S is connected through the charging resistor R1 in series with a condenser C4 and through a resistor R62 parallel to both, all in parallel with the charging condenser C. The voltage at C6 is thereby dependent upon the medium value, across R62, as well as also upon the instantaneous value, across C4 and R1, of the voltage on the charging condenser C. The alternating current which flows across C4, which is dependent upon the fluctuations in the voltage on the charging condenser C, can lead to a polarity reversal of the voltage at C6, which is prevented by the diodes D28, D29. In a positive direction, the voltage on C6 is limited through D17' to the value of the positive operating voltage on C5.

The control of the charging switch T22 in dependence upon the voltage at the delay condenser C6 is functionally identical to the embodiment of FIG. 1. However, the comparator S is synchronized across R8, or respectively R65 and D8, not with the high square wave voltage at the primary transistor T1, but with only a portion thereof, tapped off at the control condenser C7'.

As a result, the conducting period of T22, and thereby the charging time of inductor L, is longer the lower the voltage on the charging condenser C is. This voltage is regulated to a value which is adjustable with the aid of the voltage divider on the positive input of the comparator S. An appropriate selection for values of the RC elements R1, C4 results in a phase displacement such that the charging period of the inductor L, and thereby the current from the supply, is at the lowest in the middle region of the half wave of the AC voltage supply, which results in a substantial conformance of the supply current to a sinusoidal form.

In this embodiment, the converter, to the right of the phantom line, has two parallel connected lamps E, E', respectively associated with series resonant circuits C2, L2 and C2', L2'. The symmetrical supply of the lamp current circuit is important herein, together with the reversing condenser C1 being connected to the connecting point of the electrodes of the two lamps. In contrast therewith, the maintenance current circuit of the stop-thyristor T4 and the charging circuit for the starting condenser C8 extend across R4, R4' and the electrodes of the lamps which are directly connected with each other in series.

For the switching off of an ignition lamp which is continually resistant to ignition, the voltages are evaluated at the inductors L2, L2' of the series resonant circuits and conducted across voltage divider and uncoupling diodes D22, D23, in a type of an OR gate, to the RC elements C9, R3. These voltages are so large for a continually ignition-resistant lamp in the series resonant circuit, that the stop-thyristor T4 is triggered through the trigger diode D14, which then remains in this state until an exchange of the faulty lamp. The stop-thyristor T4 shunts the switch off winding L33' of the saturation transformer across the diode 11 and the starting condenser C8, and thus shuts off the converter. Since the diodes D22 and D23 are connected in a type of an OR gate to the RC element R3, C9, this switch-off function can be effected through each of the two parallel connected lamps, or concurrently through both.

The switched off condition remains until one of the two lamps is exchanged, and the maintenance current circuit of T4 is thereby interrupted. With the insertion of a new lamp, the starting condenser C8 charges through R2, R4, R4' and the electrodes of the two lamps E, E' which are connected in series, so that thereafter the converter is again activated. Shortly thereafter, sufficiently large operating voltages are available at C5 and C11 for the charging regulator, such that this circuit will also again automatically assume operation.

A modified lamp acts like a rectifier without a previously determined polarity. In such a case, at the reversing condenser C1 there can be present an extremely high positive or negative voltage of about 1000 volts, which would destroy the monitoring circuit, in particular the stop thyristor T4. To prevent this, the diode D24 in series with T4 serves for protection against a negative over-voltage on C1; in contast therewith, the diode D25 clamps the potential at C1 to that on the charging condenser C.

Although various minor modifications might be proposed by those skilled in the art, it will be understood that we wish to include within the claims of the patent warranted hereon all such changes and modifications as reasonably come within our contribution to the art.

We claim as our invention:

1. An inverter for use with a DC voltage source which delivers an unsmoothed half-wave voltage, comprising: a charging regulator having a charging capacitor connected through a charging diode and a charging inductor to said DC voltage source; a charging switch connected to the inductor; means for periodically closing the charging switch with a variable keying ratio V dependent upon a control magnitude of a control component to switch said charging inductor to the DC voltage source; a converter having two alternating control switches supplied by said charging capacitor, said two switches being a primary switch and a secondary switch connected in a series circuit parallel to said charging capacitor; means for synchronizing said control component for the charging switch by a square wave voltage on one of said primary and secondary switches such that the charging switch is closed upon blocking of one of said primary or secondary switches and, after a time period determined by a charge of a delay storage element to a certain operating value, said charging switch is blocked; and a discharge circuit of the delay storage element being conducted via said one primary or secondary switch where blocking was initially sensed.

2. An inverter according to claim 1 wherein said charging switch is controlled by a comparator having one of its inputs connected to said delay storage element.

3. An inverter according to claim 2 wherein another input of the comparator is coupled to a voltage divider, one end of which is connected to a capacitive voltage divider parallel to one of said primary and secondary switches of the converter.

4. An inverter according to claim 1 wherein said DC voltage source comprises a rectifier fed by an AC voltage mains and which supplies unsmoothed halfwave voltage, and means for providing said charge of the delay storage element so that it is dependent upon a current which flows from one of the elements consisting of the charging capacitor and the DC voltage source rectifier, said delay storage element connecting to one of said elements via a series connection of a resistance and a capacitor.

5. An inverter according to claim 4 wherein another resistance is connected in parallel with the series connection of the resistance and capacitor.

6. An inverter according to claim 1 wherein a storage capacitor for a negative operating voltage is provided, said storage capacitor being connected in parallel through an uncoupling diode and a distributor capacitor with the primary switch of the converter, the uncoupling diode being poled so that the distributor capacitor can discharge into the storage capacitor when the primary switch is in an on-position.

7. An inverter according to claim 6 wherein a series circuit of the storage capacitor and a positive operating voltage and an uncoupling diode on one side, and a series circuit of said storage capacitor for a negative operating voltage and a reversing inductor on the other side are connected through one distributor capacitor parallel to the charging switch.

* * * * *